(12) United States Patent
Krystek et al.

(10) Patent No.: US 7,885,867 B2
(45) Date of Patent: Feb. 8, 2011

(54) ENHANCED METHOD AND COMPUTER PROGRAM PRODUCT FOR PROVIDING SUPPLY CHAIN EXECUTION PROCESSES IN AN OUTSOURCED MANUFACTURING ENVIRONMENT

(75) Inventors: Susan Krystek, Highland, NY (US); George Andrews, Poughkeepsie, NY (US); Peter Badalamenti, Poughkeppsie, NY (US); James DeFilippo, Hopewell Junction, NY (US); Philippe Duffaut, Gradignan (FR); Manuel Fusco, Poughkeepsie, NY (US); Debra Hughes, Fishkill, NY (US); John McGarvey, Poughkeepsie, NY (US); Michael Meaden, Hopewell Junction, NY (US); John Pelesz, Poughkeepsie, NY (US); Jan Scofield, Fishkill, NY (US); Wes Seaman, Poughkeepsie, NY (US); Kathy Tasnady, New Hamburg, NY (US)

(73) Assignee: International Business Machines Corporation, Armonk, NY (US)

(*) Notice: Subject to any disclaimer, the term of this patent is extended or adjusted under 35 U.S.C. 154(b) by 1353 days.

(21) Appl. No.: 11/389,950

(22) Filed: Mar. 27, 2006

(65) Prior Publication Data
US 2006/0190362 A1 Aug. 24, 2006

Related U.S. Application Data

(62) Division of application No. 10/014,708, filed on Nov. 13, 2001, now Pat. No. 7,069,230.

(51) Int. Cl.
*G06Q 10/00* (2006.01)
(52) U.S. Cl. ........... 705/28; 705/7; 705/8; 705/9; 705/10; 705/22; 705/26; 705/34; 705/35; 705/29; 705/30; 705/37; 705/39; 705/100; 705/108; 705/96; 705/106

(58) Field of Classification Search ............. 705/28
See application file for complete search history.

(56) References Cited

U.S. PATENT DOCUMENTS
4,799,156 A 1/1989 Shavit et al.
(Continued)

FOREIGN PATENT DOCUMENTS
JP 11306233 A 11/1999

OTHER PUBLICATIONS

Buxey, Geoff. Strategies in an era of global competition. International Journal of Operations & Production Management, v20n9, pp. 997-1016, 2000.*

(Continued)

*Primary Examiner*—F. Zeender
*Assistant Examiner*—Fawaad Haider
(74) *Attorney, Agent, or Firm*—Cantor Colburn LLP; Yuanmin Cai

(57) ABSTRACT

A method and computer program product for facilitating supply chain processes in an outsourced manufacturing environment is provided. The method includes a customer focus team system providing logistical administrative services for a contract manufacturer on behalf of a manufacturing enterprise. The customer focus team is assigned to the contract manufacturer based upon geographic proximity. The logistical administrative services include facilitating transfer and replenishment of components needed during manufacture, ensuring ongoing inventory demand issues are addressed and resolved, and obtaining and providing metrics on outsourced supply chain parts and activities. The logistical administrative services also include assisting the contract manufacturer during shortfalls of supplies, collaborating with commodity team councils relating to acquisition of critical parts, and providing assistance on matters related to import, export, and tax issues. The method also includes a commodity council team assigned to a supplier based upon geographic proximity and providing logistical administrative support services to the supplier.

14 Claims, 5 Drawing Sheets

U.S. PATENT DOCUMENTS

| | | |
|---|---|---|
| 5,237,495 A | 8/1993 | Morii |
| 5,946,662 A | 8/1999 | Ettl et al. |
| 5,946,694 A | 8/1999 | Copeland et al. |
| 5,974,395 A | 10/1999 | Bellini et al. |
| 6,088,626 A | 7/2000 | Lilly et al. |
| 6,125,354 A | 9/2000 | MacFarlane et al. |
| 6,151,582 A | 11/2000 | Huang et al. |
| 6,167,385 A | 12/2000 | Hartley-Urquhart |
| 2002/0082891 A1 | 6/2002 | McKay et al. |
| 2002/0099612 A1 | 7/2002 | Seaman et al. |
| 2002/0188513 A1 | 12/2002 | Gil et al. |
| 2003/0050869 A1 | 3/2003 | Bruynsteen |
| 2003/0126000 A1 | 7/2003 | Clendenin |

OTHER PUBLICATIONS

U.S. Appl. No. 09/658,257, filed Sep. 8, 2000.

Kakabadse, Nada Kakabadse, Andrew, Critical review—outsourcing: A paradigm shift, Journal of Management Development, V19n8, p. 670-728, 2000.

\* cited by examiner

Exception Approval Form

| Request Date: | | Program Name: | | Bam Assembly #: | |
|---|---|---|---|---|---|
| Division: | | Prog. Volumes: | | Commodity: | |

| | | | | | |
|---|---|---|---|---|---|
| OEM P/Ns: | | | | | |
| Usage/Card: | | | | | |
| OEM Contract $: | | | | | |
| CM price: | | | | | |
| Savings/Card: | | | | | |
| Component Supplier: | | | | | |

Indicate the exception Logistic in the space provided for the commodity involved:

| Commodity | Preferred Logistic | Exception Logistic |
|---|---|---|
| SRAM (High Speed) | Buy/Sell | |
| SRAM (Low Speed) | Directed Sourcing | |
| Non-Vol EEPROM | CM Direct Buy | |
| Linears | Directed Sourcing or CM Direct Buy | |
| MCU's/Other Micros | Directed Sourcing | |
| ASICS | Directed Sourcing | |
| PLD's | Directed Sourcing | |
| Timing Solutions | Directed Sourcing | |
| VTL | Direct Buy | |
| Microprocessor CPU's | Buy/Sell | |
| Core Logic | Buy/Sell | |
| Fiber Optics | Buy/Sell | |
| Actives | CM Direct Buy | |
| Crystal | CM Direct Buy | |
| Magnetics | CM Direct Buy | |
| Tantalum Caps | CM Direct Buy | |
| Aluminum Caps | CM Direct Buy | |
| Ceramic Caps | CM Direct Buy | |
| SP & Neo Caps | CM Direct Buy | |
| Resistors | CM Direct Buy | |
| Discrete Optics | CM Direct Buy | |
| | | |
| | | |

Mark off the CM awarded below and list the specific CM location

| Indicate (X) | CM AWARDED | CM LOCATION |
|---|---|---|
| | ABC Co. | |
| | Axle, Inc. | |
| | AZ Corp | |
| | AZZ ELECTRONICS | |
| | B-1 CO | |
| | Cobra Co. | |
| | Echo, Inc. | |
| | KT, Inc. | |
| | KXT Corp. | |
| | L Products Inc. | |
| | EXCEPTION (CM not listed above) | |

Exception Business Case:

Action:

Approval Signature:                                                                 DATE

EXCEPTION FLOW GUIDELINES

| PREFERRED SOURCING LOGISTIC | EXISTING CM | | NEW CM (PROJ. SAVINGS/YR) |
| --- | --- | --- | --- |
| | EXISTING SUPPLIER (PROJ. SAVINGS/YR) | NEW SUPPLIER (PROJ. SAVINGS/YR) | |
| CM DIRECT BUY w/ OEM BENCHMARK | N/A | N/A | N/A |
| OEM DIRECTED SOURCING | N/A | NO LIMIT BY P/N TOTAL SAVINGS w/ SUPPLIER > $50K | NO LIMIT BY P/N TOTAL SAVINGS w/ CM > $100K |
| OEM BUY/SELL | $10K PER P/N | $10K PER P/N TOTAL SAVINGS w/ SUPPLIER > $100K | $10K PER P/N TOTAL SAVINGS w/ CM > $250K |

FIG. 4

COST DRIVERS

| SOURCING DIRECTIVE | NEW SUPPLIERS | NEW CM |
|---|---|---|
| OEM DIRECTED SOURCING | -RFQ/CONTRACT | -ORDER BOOK LINK<br>-DCF |
| OEM BUY/SELL | -EDI<br>-VMI | -EDI<br>-VMI<br>-A/R |

FIG. 5

ENHANCED METHOD AND COMPUTER PROGRAM PRODUCT FOR PROVIDING SUPPLY CHAIN EXECUTION PROCESSES IN AN OUTSOURCED MANUFACTURING ENVIRONMENT

CROSS REFERENCE TO RELATED APPLICATIONS

This application is a divisional of U.S. Ser. No. 10/014,708, filed Nov. 13, 2001 now U.S. Pat. No. 7,069,230, the contents of which is incorporated by reference herein in its entirety.

BACKGROUND

This invention relates generally to electronic procurement and supply chain management, and more particularly, the present invention relates to a method and computer program product for providing enhanced supply chain execution processes in an extended enterprise environment.

Effective supply chain management is becoming increasingly important to the electronics industry. In today's global economy, particularly with respect to computer technology, life cycles and prices related to electronics such as personal computers, PDAs, cellular telephones, etc., have dramatically declined over the last ten years. Further, the growth of e-commerce on the Internet creates additional pressures on this industry as traditional geographic barriers are broken down and new businesses/competitors are entering the market. In order to stay competitive, these market dynamics require electronics businesses to develop and introduce new products faster and cheaper than the competition. To meet this demand, new and enhanced business solutions are critical.

One way in which businesses are meeting these challenges is by outsourcing production of products to third parties. Outsourcing applies where the original manufacturer (called an Original Equipment Manufacturer, or OEM) buys assemblies in bulk from third-party contract manufacturers and then customizes them for a particular application. It then markets and sells the customized equipment under its own name. By outsourcing the manufacturing and assembly of these goods, established OEMs are able to focus on other business areas such as new product development and customer relationship management. Additionally, as product designs and components are becoming increasingly complex and frequently updated, a contract manufacturer with specialized skills may be better equipped to accommodate the changing technology. By outsourcing to meet peak demands, an OEM may be able to avoid having to build new facilities and/or hire new people.

In an effort to facilitate the outsourcing processes, OEMs and their manufacturers and suppliers are forming collaborative electronic networks (or extended enterprises) whereby entities within the network, or supply chain, seemingly operate and exist as a single enterprise with respect to the products being produced. In order for these separate entities to effectively operate as one, they must be able to synchronize and share information and fully integrate their existing business processes. Information shared, such as product descriptions, bills of materials (BOMs), approved manufacturers/suppliers lists, etc., must be complete, accurate and up-to-date. Additionally, architectures and applications based on open standards are required in order for complete collaboration in real time within and among the supply chain entities to occur. Few existing applications provide integrated supply chain management solutions and none of these provide complete, synchronized collaboration abilities.

For example, the bidding process between an OEM and its contract manufacturers and suppliers is riddled with inefficiencies. Oftentimes an OEM is able to procure parts components for its 'in-house' assemblies at a much cheaper price than its contract manufacturers are able to due to the large volumes of purchasing it engages in. A contract manufacturer who pays more than the OEM for the same component necessarily passes on this extra cost to the OEM once the assembly is completed. The OEM, in turn, must sell the finished product to its customers at a higher cost. If the contract manufacturer could obtain the benefit of the OEM's lower contract prices, it could produce lower cost assemblies for the OEM, providing the OEM with instant cost savings. A process is therefore desirable that can improve the existing parts procurement and production planning system and process between an OEM and its suppliers and contract manufacturers by facilitating the identification, communication, and execution of cost savings opportunities.

BRIEF SUMMARY

An exemplary embodiment of the invention relates to a method and computer program product for facilitating supply chain processes in an outsourced manufacturing environment comprising an original equipment manufacturer, at least one contract manufacturer, and at least one supplier. The method includes a customer focus team system providing logistical administrative services for a contract manufacturer on behalf of a manufacturing enterprise. The customer focus team is assigned to the contract manufacturer based upon geographic proximity. The logistical administrative services include facilitating transfer and replenishment of components needed during manufacture, ensuring ongoing inventory demand issues are addressed and resolved, and obtaining and providing metrics on outsourced supply chain parts and activities. The logistical administrative services also include assisting the contract manufacturer during shortfalls of supplies, collaborating with commodity team councils relating to acquisition of critical parts, and providing assistance on matters related to import, export, and tax issues. The method also includes a commodity council team assigned to a supplier based upon geographic proximity and providing logistical administrative support services to the supplier.

BRIEF DESCRIPTION OF THE DRAWINGS

Referring now to the drawings wherein like elements are numbered alike in the several FIGURES:

FIG. 3 is an exemplary exception approval form accessible via the outsourced supply chain tool;

FIG. 4 is an exemplary preferred sourcing plan with criteria; and

FIG. 5 is an exemplary display of benchmark data used for assisting in the establishment of a preferred sourcing plan.

DETAILED DESCRIPTION OF A PREFERRED EMBODIMENT

In an exemplary embodiment, the outsourced supply chain tool automates supply chain processes in order to streamline the production and distribution of goods in a manufacturing environment. It involves generating a price protection plan from data gathered such as forecasting and demand data, supplier commitments, contract manufacturer award data, and logistical data and executing the plan according to business rules adopted via the tool. Price protection plans are generally cost-savings strategies determined to be of some financial or logistical advantage to a business. The tool also monitors correlated activities such as compliance with terms and conditions set forth in the price protection plans and provides performance measurements for evaluation and plan updates.

Figure 1:
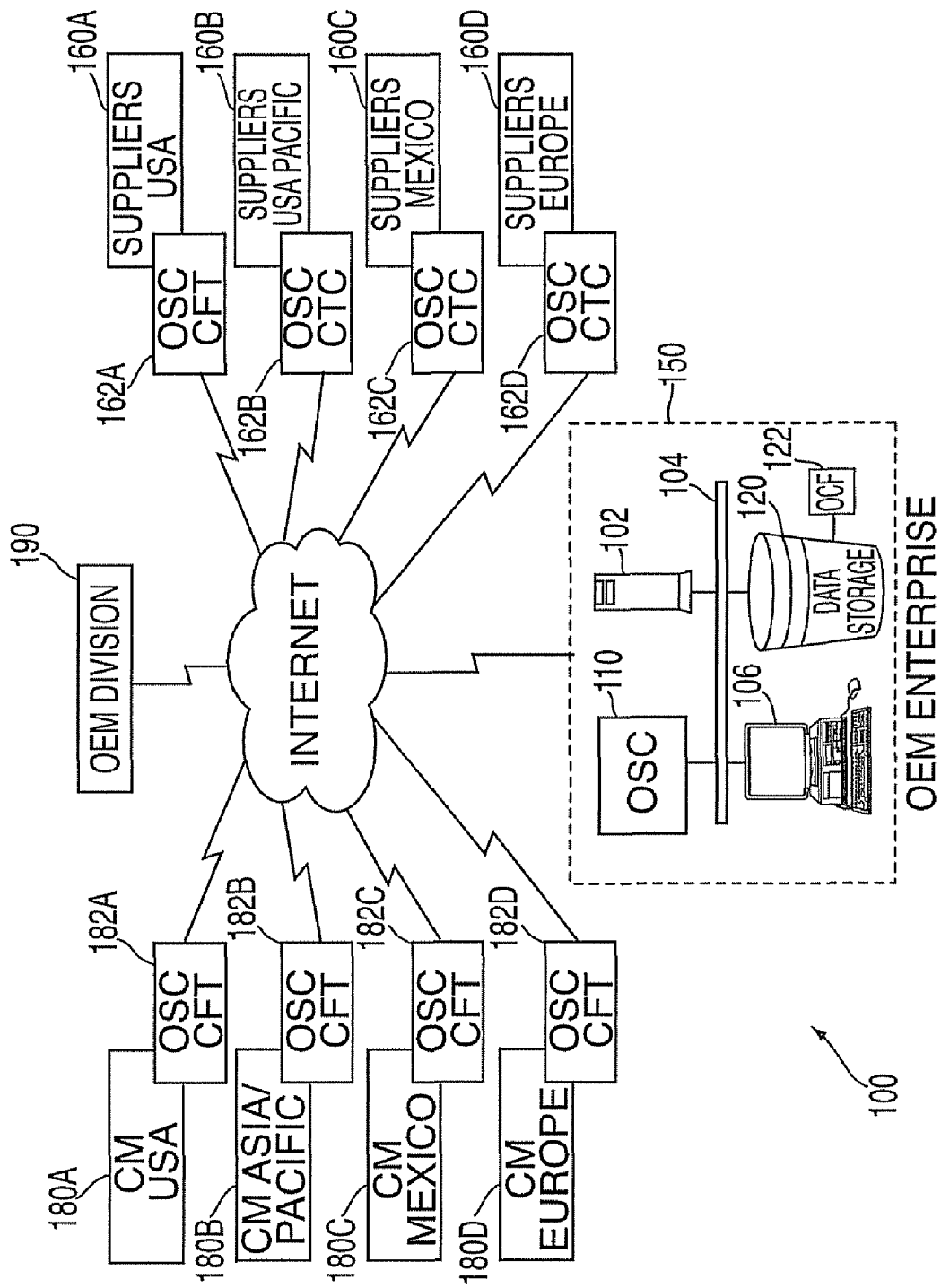
FIG. 1 is a block diagram of a network system on which the outsourced supply chain application is executed in an exemplary embodiment of the invention.

In terms of structure, reference is now made to FIG. 1. Therein depicted is a block diagram representing a network system 100 for implementing the outsourced supply chain tool of the present invention. System 100 includes an OEM enterprise system 150 comprising a server 102 connected through a communications network 104 to a terminal 106. OEM enterprise system 150 may be central office or corporate facility of an OEM business. Network 104 may comprise a LAN, a WAN, or other network configuration known in the art. Further, network 104 may include wireless connections, radio-based communications, telephony-based communications, and other network-based communications. Terminal 106 may be a network PC, or 'dumb client', which allows users access to applications executed via server 102 in a client/server architecture mode. Client/server network configurations are well known in the industry and will be appreciated by those skilled in the art.

Enterprise system 150 is preferably operating web server software designed to accommodate various forms of communications via internal network 104 and any external network (e.g., Internet, Extranet). Such forms of communications include voice, video, and text. Any web server software or similar program that handles general communications protocols and transport layer activities could be used as appropriate for the network protocol in use. For purposes of illustration, enterprise system 150 is running Lotus Domino™ for communicating with external entities over the Internet and Lotus Notes™ for its internal "intranet" communications, however, any compatible e-mail-integrated, web-enabled collaborative software could be used. Enterprise system 150 preferably executes the outsourced supply chain tool of the present invention, however, it could alternatively be executed under an outsourced arrangement via an Applications Services Provider (ASP) under a subscription agreement or other suitable mechanism. The outsourced supply chain application may be one of many business applications employed by OEM enterprise 150 which, in combination, constitute its Enterprise Resource Planning and Materials Requirements Planning suites. Enterprise system 150 may also execute a bridging tool for integrating data from various databases utilized by enterprise system 150 for mapping together pertinent physical attributes for parts on a BOM (e.g., part number, part name, and description) with relevant, associated business characteristics such as special negotiated prices and contract terms from which enterprise system 150 and/or its representatives can review and identify cost savings opportunities and develop a price protection plan therefrom. This tool can be proprietary or may be the A-Source tool and bridging application disclosed in U.S. patent application Ser. No. 09/730, 683 entitled "Parts Requirement Planning System and Method Across an Extended Supply Chain", filed on Dec. 6, 2000, which is incorporated herein by reference in its entirety. Enterprise system 150 may also execute one or more tools for facilitating the transfer and execution of electronic change notifications (ECNs) and end-of-life (EOL) notices and integrating this information into its MRP system. One such tool is disclosed in patent application Ser. No. 09/658,257 entitled, "E-Collaboration Commodity Management System and Method", filed on Sep. 8, 2000, which is incorporated herein by reference in its entirety.

Data storage device 120 is also included in enterprise system 150 and may be any form of mass storage device configured to read and write database type data maintained in a file store (e.g., a magnetic disk data storage device). Information stored in data storage device 120 may be retrieved and manipulated by database management software executed via server 102 such as IBM's DB/2® software. Data storage device 120 provides a repository for a variety of databases, including a logistics database (e.g., a database for storing component level demand detail), a parts catalog database, administrative database (e.g., for storing approved vendor lists, access and security authorizations, etc.), and decentralized file (DCF) database 122. DCF database 122 will be explained further herein. Also stored in data storage device 120 may be a catalog or collection of tables used by the bridging component described above in conjunction with the Outsourced supply chain tool in order to integrate various types of data received from different sources. Although a client/server system architecture has been described for implementing the outsourced supply chain tool, it is understood that alternative network configurations known in the art may be utilized by enterprise system 150 in order to realize the advantages of the present invention. An outsourced supply chain (OSC) group 110 at enterprise system 150 administers and monitors the execution and performance of the outsourced supply chain tool.

Division 190 represents a manufacturing facility of enterprise system 150. Division 190 purchases select products and/or assemblies from its contract manufacturing trading partners. Division 190 may itself manufacture products in its in-house facilities. Division 190 may include a procurement team or department which facilitates the BOM and 'request for quote' (RFQ) processes on behalf of its manufacturing personnel and is preferably one of a number of divisions of enterprise system 150 which may be scattered around the globe. Division 190 may include general computer processing devices, software, and network communications capabilities for generating, communicating, and executing BOM-related information to entities within its organization as well as with external entities and trading partners and for facilitating the objectives set forth via the outsourced supply chain tool as will be described further herein.

Contract manufacturer (CM) systems 180A-180D may be independent commercial manufacturers doing business with enterprise system 150 under an agreement. CM systems 180A-180D may be located in various regions of the world and are shown in FIG. 1 to be located in the United States 180A, Asia and the Pacific 180B, Mexico 180C, and Europe 180D for illustrative purposes. Of course, it will be understood that any number of countries, regions, or locations may be included in system 100 in order to realize the advantages of the invention. Further, although only one contract manufacturer system is shown in each of locations 180A-180D, any number of CM systems may be included in system 100. System devices utilized by CM systems 180A-180D may include communications hardware and software such as web-enabled general purpose computer devices with Internet access for communicating with enterprise system 150, CFTs 182A-182D, and supplier systems 160A-160D as needed. Further, CM systems 180A-180D may include e-transaction capabilities for directly procuring components and business data pursuant to the particular price protection plan and technique adopted by enterprise 150. E-transaction software and systems such as electronic invoicing and payment processing are well known and will be appreciated by those skilled in the art.

Each of customer focus team systems 182A-182D performs administrative and support services to one or more of corresponding CM systems 180A-180D such as facilitating the transfer and replenishment of components needed during manufacture. CFTs are preferably located nearby their CM systems for facilitating onsite visits and for ensuring that ongoing inventory demand issues can be addressed and resolved immediately. CFT systems 180A-180D also obtain and provide metrics on OSC parts and activities to OSC group 110 at enterprise system 150 for tracking the performance of CM systems and generating reports. CFT systems may also assist the CM where shortfalls exist with supplies and collaborate with Commodity Team Council systems (CTCs) for acquiring critical parts. CFTs may also provide or obtain assistance on matters related to VAT, import, and export issues within its territory as well as provide support to other CFTs from other regions relating to unique CM issues.

Each of CFT systems 182A-182D may include general communications capabilities via computer processing and network devices such as those described in enterprise system 150 and/or CM systems 180. Further CFTs 182A-182D are preferably situated in close or convenient proximity of their respective CM counterparts.

Supplier systems 160A-160D provide components and parts to OEM division 190 and/or one or more of CM systems 180A-180D. CTCs 162A-162D provide administrative and support services to their counterpart supplier systems 160A-160D. Both supplier systems 160A-160D and CTCs 162A-162D include communications capabilities for transacting business with OEM enterprise system 150 such as web-enabled general purpose computing devices and Internet access or an extranet network. Supplier systems 160A-160D may be located in any number of locations around the globe although only four locations are shown for illustrative purposes. Further, locations of each of supplier systems 160A-160D may include any number of independent supplier enterprises engaged in trade with OEM enterprise system 150 and/or one or more of CM systems 180A-180D. Roles and responsibilities of CTCs may include ensuring that all purchase orders related to its supporting supplier(s) are timely placed; managing the order books of its suppliers; providing OSC metrics; escalating shortfalls identified with suppliers; assisting CFT systems in acquiring critical parts; facilitating replenishment implementation and drive to complete drop shipment functions; resolving finance issues; supplier visits, providing support for other OSC regions on unique supplier issues; providing input on supplier report cards; interfacing with council chairs on contract issues, geographical allocations, supplier credits, and letters to suppliers on transfers; etc.

Prior to executing the outsourced supply chain tool, a typical OEM or its manufacturing division generates a request for quote (RFQ), attaching a BOM file and inviting specified CMs to bid on the items. Once the bids are received, analyzed, and an award is determined, the outsourced supply chain tool is initiated. All or part of this process can be accomplished electronically via software tools discussed above.

The outsourced supply chain tool enables an organization to identify, implement, and monitor strategic cost savings techniques and execution processes for existing supply chain functions by receiving and analyzing data received by different sources and stored in various locations. The tool applies user-defined business rules to this information, resulting in a consolidated business plan for leveraging and optimizing savings using fewer resources. Business rules involve adopting specified pricing techniques to various procurement scenarios and shifting specified activities or responsibilities from the OEM to its trading partners where feasible.

Examples and descriptions of execution plans for various price protection techniques are provided herein as follows.

Buy/Sell. OEM's outsourced supply chain team buys off OEM's negotiated contracts at the OEM price and sells to a contract manufacturer at an uplifted market price. The OSC team rebates the difference between the 'buy' price and the 'sell' price to the OEM division purchasing the assembly from the contract manufacturer.

Direct Supplier Rebate. OEM division directs a contract manufacturer to buy strategic parts from an approved supplier that participates in the OEM direct rebate process. The supplier sells directly to the contract manufacturer, then rebates the difference between their selling (e.g., market) price and the OEM contract price to the OEM.

Consignment. OEM division buys strategic parts directly from an approved supplier. The OEM division then consigns these parts to a contract manufacturer.

Buy Off Contracts. The contract manufacturer buys required parts directly from an approved OEM parts supplier at the OEM negotiated price. Prior to executing this technique, the contract manufacturer may be required to obtain the approval of the respective commodity team council (CTC) and the component supplier via a letter of authorization (LOA).

Figure 2:
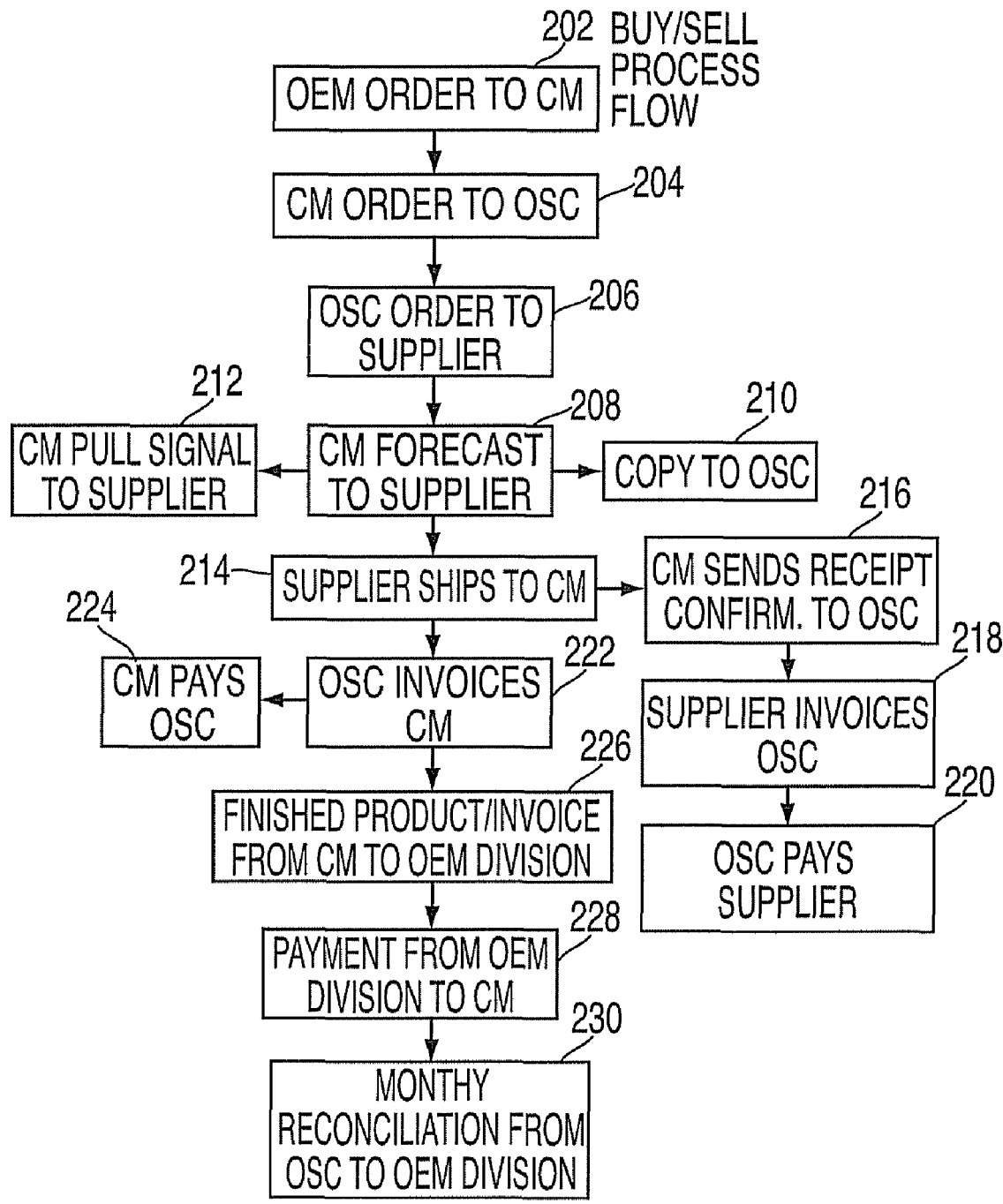
FIG. 2 is a flowchart of the outsourced supply chain execution process relating to a buy/sell technique.

Once a price protection plan has been agreed upon, it is implemented via the outsourced supply chain tool in accordance with business rules adopted by the OEM. A sample price protection plan process flow relating to the buy/sell technique is highlighted in FIG. 2.

OEM division 190 places an order for an assembly with one of contract manufacturing systems 180 at step 202 as per the contract award agreement identified above. The purchase order is received by contract manufacturing system 180 which then separates out designated parts listed in the order for special execution and places an order for those special execution parts with the outsourced supply chain tool at step 204. In turn, the outsourced supply chain tool sends the order to one of supplier systems 160 designated by OEM 150 according to business rules adopted at step 206. The order specifies that these parts are to be sold to contract manufacturing system 180 at a specially-negotiated contract price. Contract manufacturing system 180 sends a forecast to supplier system 160 with a copy to the outsourced supply chain tool. Contract manufacturing system 180 then sends a pull signal to supplier system 160 for delivery of these parts. Supplier system 160 drop ships the parts directly to contract manufacturing system 180. Contract manufacturing system 180 sends a receipt confirmation to the outsourced supply chain tool and supplier system 160 invoices the outsourced supply chain tool. The outsourced supply chain tool then transmits payment to supplier system 160. The outsourced supply chain tool invoices contract manufacturing system 180 who then pays the outsourced supply chain. The finished assembly and invoice are sent from contract manufacturing system 180 to the OEM division 190. Payment is made from the OEM division 190 to contract manufacturing system 180. A monthly reconciliation report is generated by the outsourced supply chain tool and sent to the OEM division 190.

The outsourced supply chain tool may be customized by an OEM to establish business rules for specifying the sourcing strategy for new parts released by the OEM. The strategy, 'CM DIRECT BUY' may provide that the contract manufacturer be responsible for procuring the parts provided for in the bid award agreement rather than go through a third party for sourcing. Below illustrates one example illustrating a preferred sourcing strategy which is determined and set by commodity groups.

| COMMODITY | OEM BUY/SELL | CM DIRECT BUY |
|---|---|---|
| Resistors | X | |
| Diodes | | X |
| Fiber Optics | X | |

The outsourced supply chain tool allows authorized entities to request exceptions to these rules providing additional flexibility. A sample exception approval form 300 accessible via the outsourced supply chain tool is illustrated in FIG. 3. A requesting entity enters the information as indicated on exception approval form 300 and electronically transmits the form to the appropriate recipient. Recipients providing approval may be selected by management personnel of enterprise system 150 and may include individuals from OSC group 110. Exception flow guidelines or business rules for determining when exceptions may be appropriate can also be customized. Criteria used to determine preferred sourcing strategies may be include factors such as whether the parties to the sourcing arrangement (e.g., contract manufacturer, supplier) are existing trading partners of enterprise system 150 or whether they are new. For example, FIG. 4 illustrates a sample configuration of preferred sourcing according to the status of the trading partner(s). The information available for assessing the benchmarks for these items can be obtained from a variety of sources via the outsourced supply chain tool, a sample of which is shown in FIG. 5.

The outsourced supply chain tool further enables operational process measurements to be gathered in order to ensure that the outsourced supply chain process is operating efficiently and effectively. This in accomplished in part, via DCF database 122 of FIG. 1. DCF database 122 allows for the extractions of contract manufacturer-specific data including part numbers, supplier split percentages, and appropriate pricing (e.g., contract price for 'buy off contracts' parts, OEM sell price for price-masked parts, etc.). The information is segregated for each contract manufacturer and the data may be sent electronically to the contract manufacturer's password-protected mailbox. The information contained therein may be used by the contract manufacturer to generate purchase orders as required by the price protection plan in effect.

The outsourced supply chain tool additionally enables OSC group 110 to monitor the ordering patterns of the contract manufacturers to ensure compliance with the terms and conditions set forth in the manufacturing agreement. Any disparities noted between the type and number of parts ordered by the contract manufacturer and the type and number of parts indicated as necessary by the outsourced supply chain tool may addressed and resolved by the parties via this vehicle. Orderbooks are available through the tool whereby orders placed in the OSC system via contract manufacturers around the globe can be consolidated for greater visibility and price leveraging.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A method for facilitating supply chain processes in an outsourced manufacturing environment, comprising:
a customer focus team system providing logistical administrative services for a contract manufacturing system via a computer processing device on behalf of a manufacturing enterprise, the customer focus team assigned to the contract manufacturing system based upon geographic proximity of the customer focus team to the contract manufacturing system, the logistical administrative services including:
facilitating transfer and replenishment of components needed during manufacture;
ensuring ongoing inventory demand issues are addressed and resolved;
obtaining and providing metrics on outsourced supply chain parts and activities;
assisting the contract manufacturing system during shortfalls of supplies;
collaborating with the commodity team council systems relating to acquisition of critical parts; and
providing assistance on matters related to import, export, and tax issues; and
a commodity council team system providing logistical administrative support services to a supplier system via a computer processing device on behalf of the manufacturing enterprise, the commodity council team system assigned to the supplier system based upon geographic proximity of the commodity council team system to the supplier system;
wherein the logistical administrative services provided by the commodity council team system include at least one of: ensuring timely placement of purchase orders relating to supporting supplier systems, managing order books of the supporting supplier systems, providing outsourced supply chain metrics relating to supply chain activities, escalating shortfalls identified for inventories of the supplier systems, assisting the customer focus team systems in acquiring critical parts, facilitating replenishment implementation and drive to complete drop shipment functions, resolving finance issues, visiting the supplier systems, providing support for other outsourced supply chain regions on unique supplier issues, providing input on supplier report cards, and interfacing with council chairs on contract issues, geographical allocations, supplier credits, and letters to suppliers on transfers;
wherein the method further comprises:

generating a price protection plan for the contract manufacturing system and the supplier system by gathering data relating to goods to be manufactured;

developing the business rules operable for identifying cost savings in accordance with existing negotiated contract pricing and contract terms and conditions of trading partner agreements;

executing supply chain activities utilizing results of the generating a price protection plan and the developing business rules; and providing an exception approval form to the contract manufacturing system and the supplier system operable for requesting exceptions to business rules and a price protection plan adopted by the manufacturing enterprise.

2. The method of claim 1, wherein the data includes:
forecast and demand data;
supplier commitment data;
contract manufacturing system award data; and
logistical data.

3. The method of claim 1, wherein commodity team council systems are created for each commodity associated with the supplier system.

4. The method of claim 1, further comprising directing the contract manufacturing system to generate purchase orders via a decentralized file database of the manufacturing enterprise, comprising:

extracting data relating to products and assemblies manufactured by contract manufacturer systems, the data including:
part numbers;
supplier split percentages; and
pricing;
segregating extracted data for each of the contract manufacturing systems; and
transmitting the extracted data to each of the contract manufacturing systems.

5. The method of claim 1, further comprising directing the contract manufacturing system and the supplier system to perform:
directly procuring parts pursuant to a bid award;
executing a purchase order for directly procured parts; and
executing invoice and payment procedures for the directly procured parts.

6. A computer program product for facilitating supply chain processes in an outsourced manufacturing environment, the computer program product including instructions embodied on a computer readable storage medium which when executed by a computer cause the computer to implement a method, the method comprising:

providing logistical administrative services for a contract manufacturing system by a customer focus team on behalf of a manufacturing enterprise, the customer focus team assigned to the contract manufacturing system based upon geographic proximity of the customer focus team to the contract manufacturing system, the logistical administrative services including:
facilitating transfer and replenishment of components needed during manufacture;
ensuring ongoing inventory demand issues are addressed and resolved;
obtaining and providing metrics on outsourced supply chain parts and activities;
assisting the contract manufacturing system during shortfalls of supplies;
collaborating with the commodity team council systems relating to acquisition of critical parts; and
providing assistance on matters related to import, export, and tax issues; and providing logistical administrative support services to a supplier system by a commodity council team system on behalf of the manufacturing enterprise, the commodity council team system assigned to the supplier system based upon geographic proximity of the commodity council team system to the supplier system;

wherein the logistical administrative services provided by the commodity council team system include at least one of: ensuring timely placement of purchase orders relating to supporting supplier systems, managing order books of the supporting supplier systems, providing outsourced supply chain metrics relating to supply chain activities, escalating shortfalls identified for inventories of the supplier systems, assisting the customer focus team systems in acquiring critical parts, facilitating replenishment implementation and drive to complete drop shipment functions, resolving finance issues, visiting the supplier systems, providing support for other outsourced supply chain regions on unique supplier issues, providing input on supplier report cards, and interfacing with council chairs on contract issues, geographical allocations, supplier credits, and letters to suppliers on transfers;

wherein the method further comprises:
generating a price protection plan for the contract manufacturing system and the supplier system by gathering data relating to goods to be manufactured;
developing the business rules operable for identifying cost savings in accordance with existing negotiated contract pricing and contract terms and conditions of trading partner agreements;
executing supply chain activities utilizing results of the generating a price protection plan and the developing business rules; and
providing an exception approval form to the contract manufacturing system and the supplier system operable for requesting exceptions to business rules and a price protection plan adopted by the manufacturing enterprise.

7. The computer program product of claim 6, wherein the data includes:
forecast and demand data;
supplier commitment data;
contract manufacturing system award data; and
logistical data.

8. The computer program product of claim 6, wherein commodity team council systems are created for each commodity associated with the supplier system.

9. The computer program product of claim 6, further comprising instructions for directing the contract manufacturing system to generate purchase orders via a decentralized file database of the manufacturing enterprise, comprising:
extracting data relating to products and assemblies manufactured by contract manufacturer systems, the data including:
part numbers;
supplier split percentages; and
pricing;
segregating extracted data for each of the contract manufacturing systems; and
transmitting the extracted data to each of the contract manufacturing systems.

10. The computer program product of claim 6, further comprising instructions for directing the contract manufacturing system and the supplier system to perform:

directly procuring parts pursuant to a bid award;
executing a purchase order for directly procured parts; and
executing invoice and payment procedures for the directly procured parts.

11. A method of delivering a services offering for facilitating supply chain processes in an outsourced manufacturing environment, the method comprising:
  a customer focus team system providing logistical administrative services for a contract manufacturing system on behalf of a manufacturing enterprise, the customer focus team assigned to the contract manufacturing system based upon geographic proximity of the customer focus team to the contract manufacturing system, the logistical administrative services including:
    facilitating transfer and replenishment of components needed during manufacture;
    ensuring ongoing inventory demand issues are addressed and resolved;
    obtaining and providing metrics on outsourced supply chain parts and activities;
    assisting the contract manufacturing system during shortfalls of supplies;
    collaborating with the commodity team council systems relating to acquisition of critical parts; and
    providing assistance on matters related to import, export, and tax issues; and
  a commodity council team system providing logistical administrative support services to a supplier system on behalf of the manufacturing enterprise, the commodity council team system assigned to the supplier system based upon geographic proximity of the commodity council team system to the supplier system;
  wherein the logistical administrative services provided by the commodity council team system include at least one of: ensuring timely placement of purchase orders relating to supporting supplier systems, managing order books of the supporting supplier systems, providing outsourced supply chain metrics relating to supply chain activities, escalating shortfalls identified for inventories of the supplier systems, assisting the customer focus team systems in acquiring critical parts, facilitating replenishment implementation and drive to complete drop shipment functions, resolving finance issues, visiting the supplier systems, providing support for other outsourced supply chain regions on unique supplier issues, providing input on supplier report cards, and interfacing with council chairs on contract issues, geographical allocations, supplier credits, and letters to suppliers on transfers;
  wherein the method further comprises:
    generating a price protection plan for the contract manufacturing system and the supplier system by gathering data relating to goods to be manufactured;
  developing the business rules operable for identifying cost savings in accordance with existing negotiated contract pricing and contract terms and conditions of trading partner agreements;
  executing supply chain activities utilizing results of the generating a price protection plan and the developing business rules; and
  providing an exception approval form to the contract manufacturing system and the supplier system operable for requesting exceptions to business rules and a price protection plan adopted by the manufacturing enterprise.

12. The method of claim 11, wherein the data includes:
  forecast and demand data;
  supplier commitment data;
  contract manufacturing system award data; and
  logistical data.

13. The method of claim 11, wherein commodity team council systems are created for each commodity associated with the supplier system.

14. The method of claim 11, further comprising directing the contract manufacturing system to generate purchase orders via a decentralized file database of the manufacturing enterprise, comprising:
  extracting data relating to products and assemblies manufactured by contract
  manufacturer systems, the data including:
    part numbers;
    supplier split percentages; and
    pricing;
  segregating extracted data for each of the contract manufacturing systems; and
  transmitting the extracted data to each of the contract manufacturing systems.

* * * * *